(No Model.) 5 Sheets—Sheet 1.
W. J. THOMAS, Dec'd.
H. Thomas, Administratrix.
METALLURGICAL FURNACE.
No. 578,665. Patented Mar. 9, 1897.

WITNESSES:

INVENTOR:
William J. Thomas.
BY
ATTORNEYS (No Model.)

W. J. THOMAS, Dec'd.
H. Thomas, Administratrix.
METALLURGICAL FURNACE.

No. 578,665.

5 Sheets—Sheet 2.

Patented Mar. 9, 1897.

WITNESSES:

INVENTOR:
William J. Thomas
BY Munn & Co.
ATTORNEYS (No Model.) 5 Sheets—Sheet 3.

W. J. THOMAS, Dec'd.
H. THOMAS, Administratrix.
METALLURGICAL FURNACE.

No. 578,665. Patented Mar. 9, 1897.

WITNESSES:
M. D. Bloudell
P. B. Turpin.

INVENTOR:
William J. Thomas.

BY Munn & Co.
ATTORNEYS (No Model.) 5 Sheets—Sheet 4.
W. J. THOMAS, Dec'd.
H. THOMAS, Administratrix.
METALLURGICAL FURNACE.
No. 578,665. Patented Mar. 9, 1897.
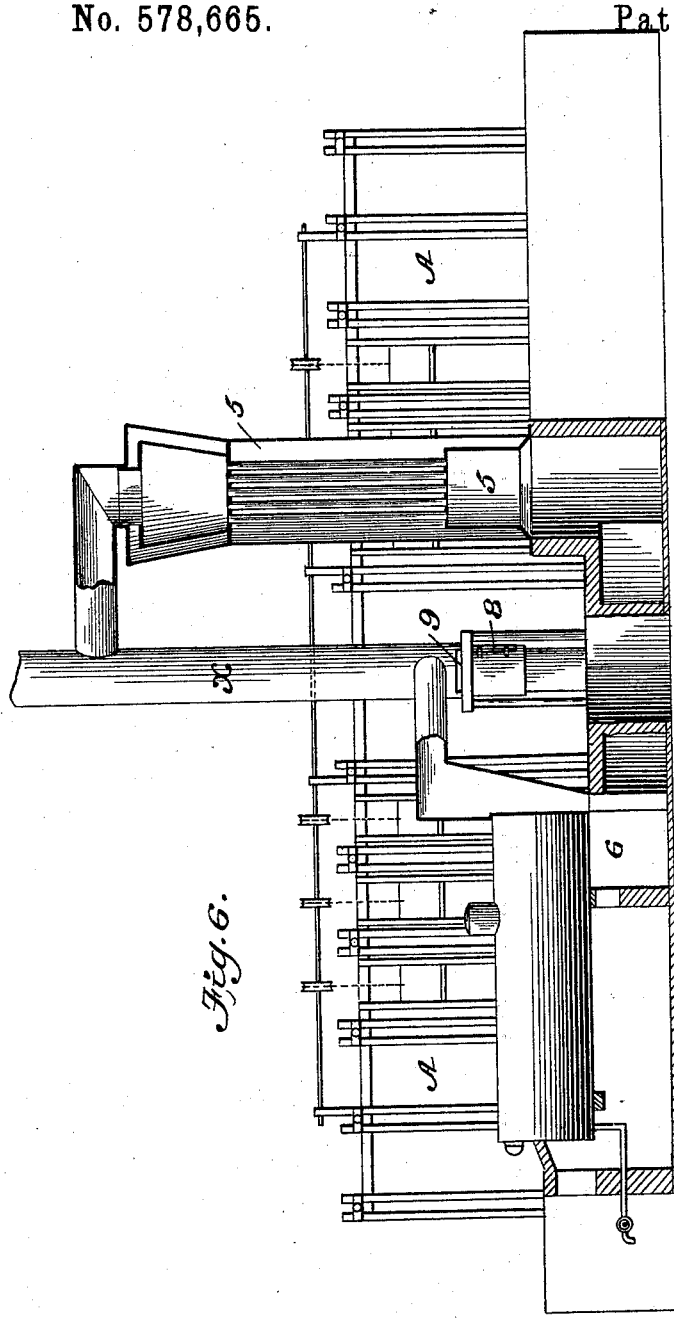
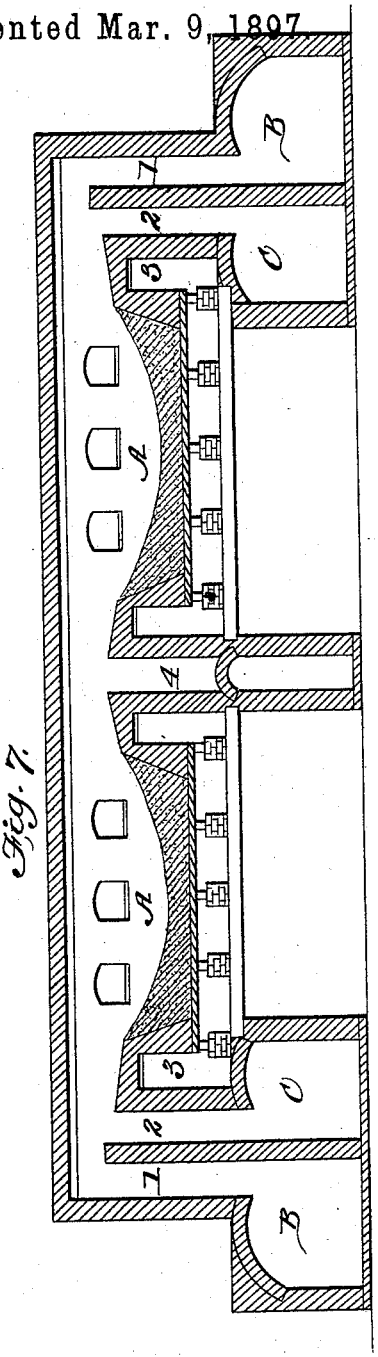
WITNESSES:
M. D. Bloudel,
P. B. Turpin.
INVENTOR:
William J. Thomas.
BY Munn & Co.
ATTORNEYS

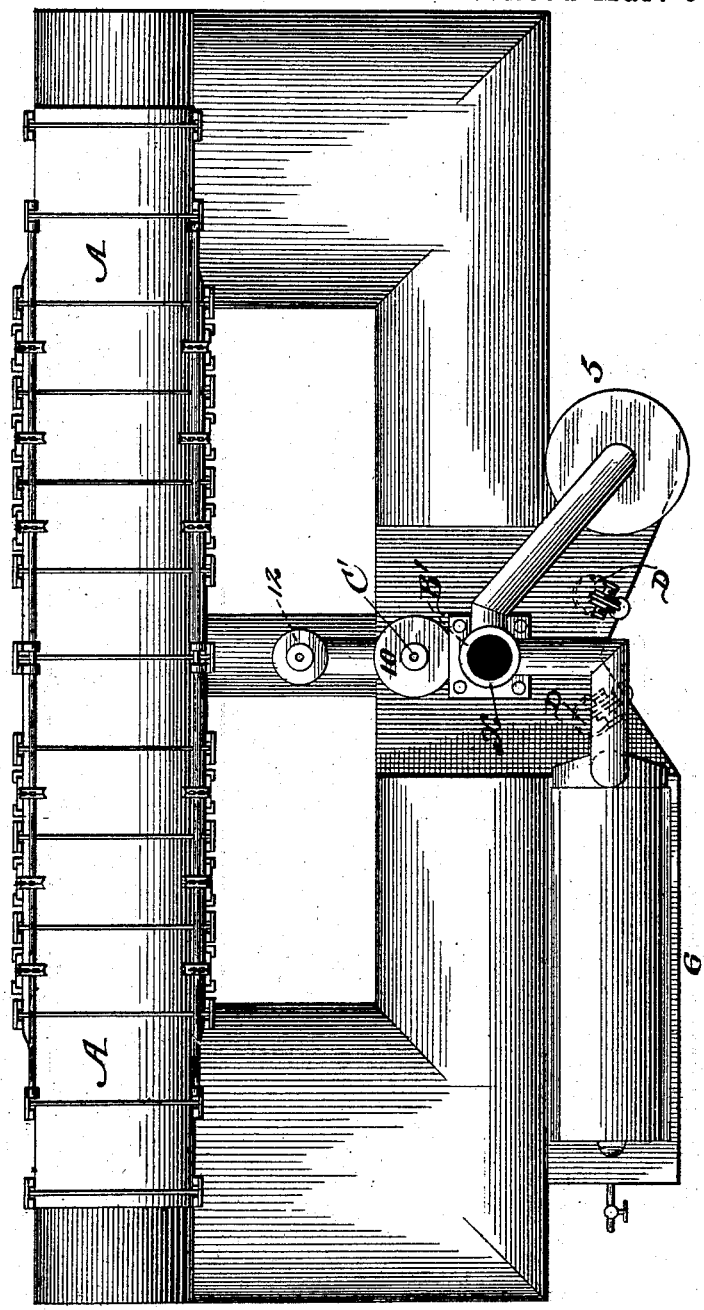

UNITED STATES PATENT OFFICE.

WILLIAM J. THOMAS, OF CANAL DOVER, OHIO; HANNAH THOMAS ADMINISTRATRIX OF SAID WILLIAM J. THOMAS, DECEASED.

METALLURGICAL FURNACE.

SPECIFICATION forming part of Letters Patent No. 578,665, dated March 9, 1897.

Application filed July 5, 1895. Serial No. 555,004. (No model.)

*To all whom it may concern:*

Be it known that I, WILLIAM J. THOMAS, of Canal Dover, in the county of Tuscarawas and State of Ohio, have invented a new and useful Improvement in Metallurgical Furnaces, of which the following is a specification.

My invention is an improved metallurgical furnace, and has for an object to provide certain improvements in the devices for admitting and controlling the passage of the hot air and gas.

The invention has for further objects other improvements; and it consists in certain novel constructions, combinations, and arrangements of parts, as will be hereinafter described, and pointed out in the claims.

Figure 1:
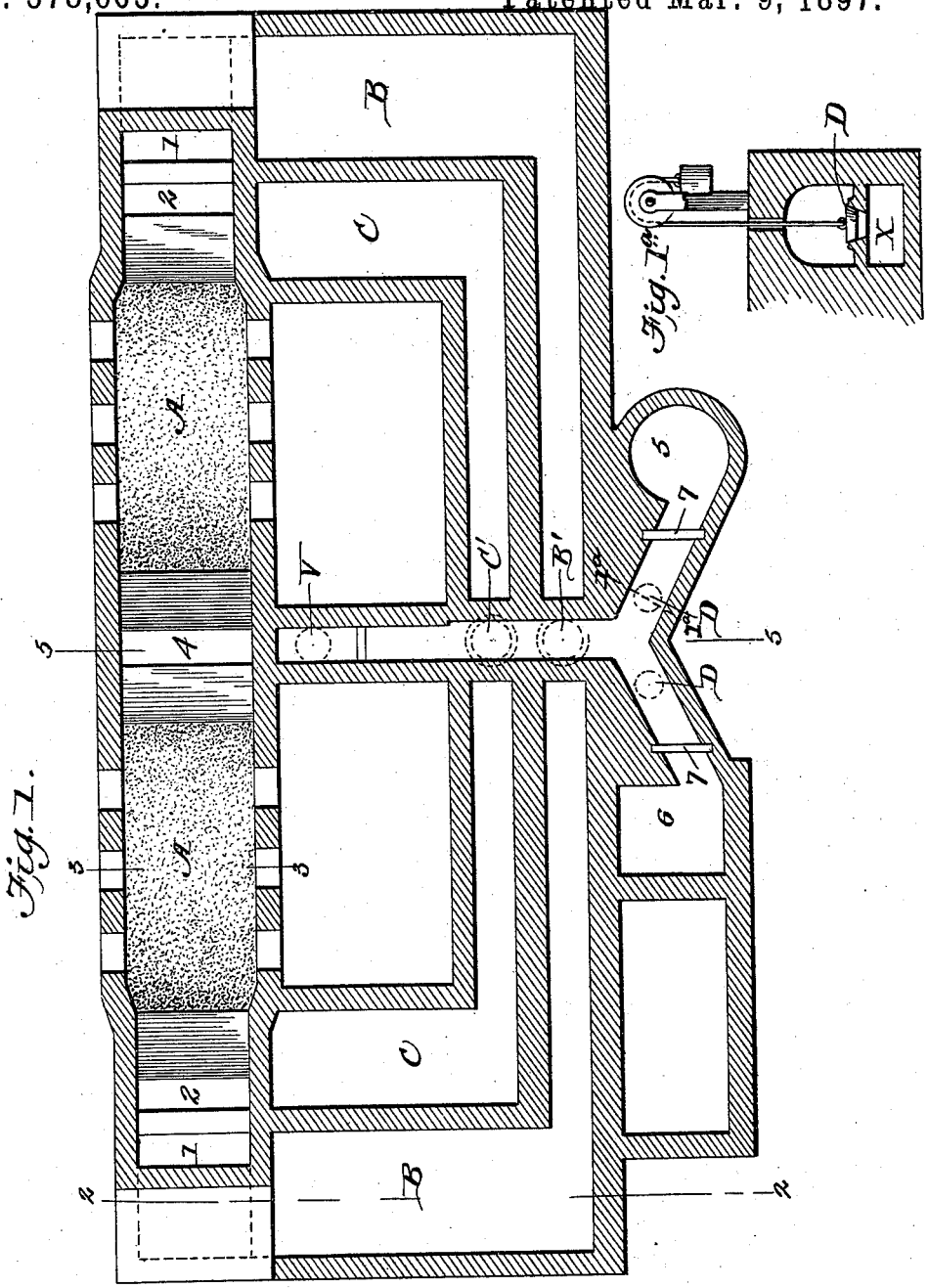
Figure 2:
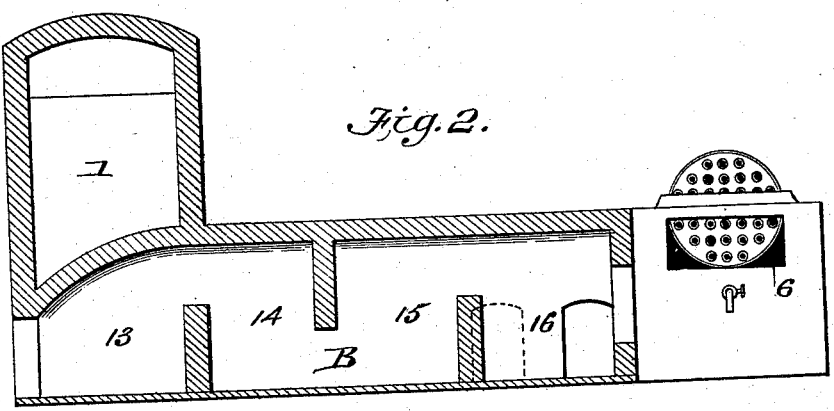
Figure 3:
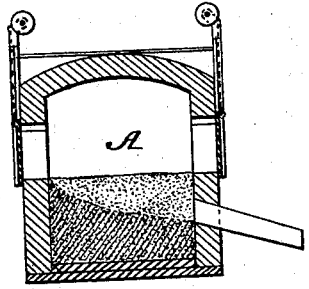
Figure 4:
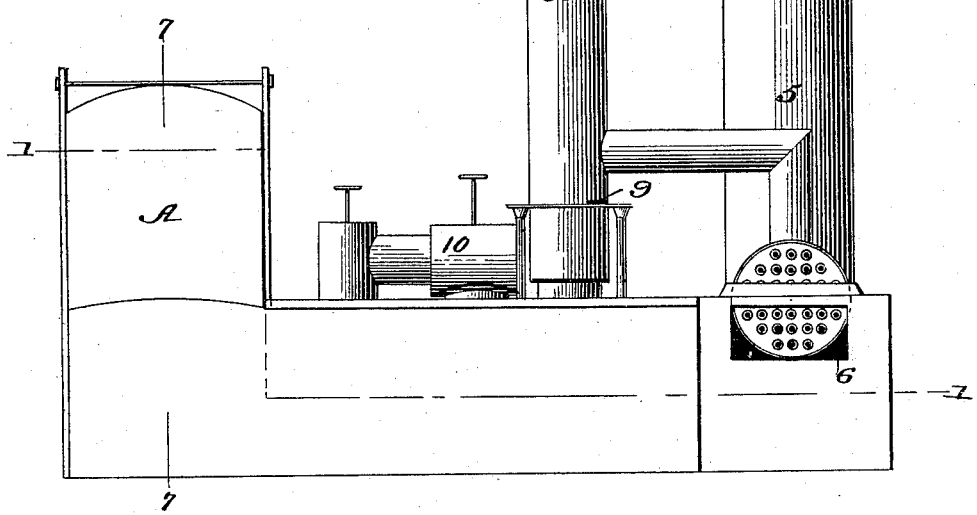
Figure 5:
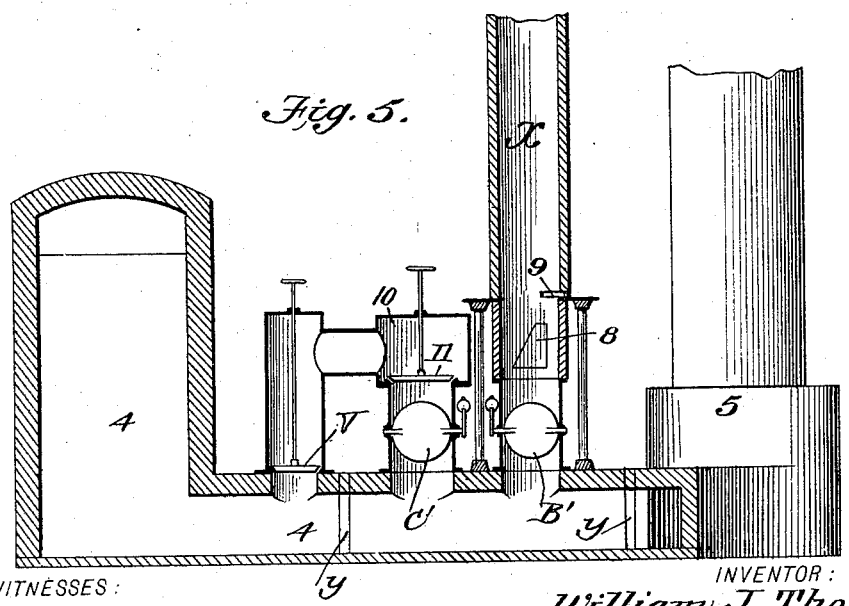

In the drawings, Figure 1 is a section on the line 1 1 of Fig. 4, and Fig. 1ª represents one of the valves in detail. Fig. 2 is a section on the line 2 2 of Fig. 1. Fig. 3 is a section on the line 3 3 of Fig. 1. Fig. 4 is an end view. Fig. 5 is a section on the line 5 5 of Fig. 1. Fig. 6 is a rear view, partly in section. Fig. 7 is a section on the line 7 7 of Fig. 4 and Fig. 8 is a top plan view.

In the construction shown the furnace has two hearths A A, at the outer sides of each of which are provided the gas-flues 2 and the air-flues 1. Chills or air-spaces 3 are formed below and alongside the hearths, and between them I provide a main or central gas-flue 4, through which is supplied a steady flow of gas at all times during operation.

In operation the air and gas in flues 1 and 2 are reversed from one end to the other about every twenty or thirty minutes and the gas in flue 4 is also reversed along with the draft of the furnace to the stack or chimney, the perfect combustion taking place at the top of the central flue 4 carrying the heat through the hearth on either side as reversed.

Chambers B and C communicate, respectively, with the flues 1 and 2 and are checkwork-chambers, being filled with bricks checkered or other heat-absorbing material, so as to superheat the gas or air. The supply of gas to the central flue is controlled by the valve V. Valves B' and C' control the passage of gas to the chambers B and C.

A vertical boiler 5 is connected by flues to receive the residue or surplus heat from the furnace, and a horizontal boiler has its combustion-chamber 6 connected by flues to receive a part of the residue or surplus heat, suitable valves at D controlling a supply of gas to the residue or surplus heat passing to the said boiler to aid in producing a perfect combustion, such supply of gas to the residue or surplus heat forming an important feature of my invention. This gas may be admitted from a chamber X below the flues leading to the boiler (see Fig. 1ª) and this chamber X may be supplied with gas by connection with the gas-flues of the furnace or with a separate supply of gas or otherwise, as may be most convenient.

If anything happens to either or both boilers when the furnace is working, they may be cut off at 7 by a wall or otherwise, leaving the furnace-draft to the stack or chimney over the valve B' with an air-supply in the shape of a lifting door or damper 8 for air-supply for superheating through the chamber B.

At 9 I supply air for perfect combustion when the furnace works direct to stack or chimney, the surplus heat coming through valve C', returning through the valve B', and returning into furnace with the air-supply through 9. When the residue or surplus goes direct to the boiler or boilers, the residue passes through both valves C' and B', as shown.

Above the gas-valve C' is formed a large gas-chamber 10, controlled by a mushroom-damper 11, and V is a valve controlling communication between chamber 10 and the flue 4.

The chambers B are formed with four compartments 13, 14, 15, and 16, the compartment 13 being one from which the droppings from the brick walls can be readily cleaned when the furnace is working, the other compartments 14, 15, and 16 being checkwork-compartments.

An important feature of my improvement is the admission of gas into the hot air leav- the furnace, producing a perfect combustion under the boiler.

Manifestly the furnace can be applied to glass-melting, as well as to steel or similar metals.

The stack X (shown in Figs. 4 and 5) may be of any suitable construction.

At Y in the flue 4 (see Fig. 5) I may employ a damper or removable wall for the purpose of gaining access from flue 4 to the stack or chimney to burn out soot from mushroom damper or valve at any time required.

Having thus described my invention, what I claim as new, and desire to secure by Letters Patent, is—

1. In a metallurgical furnace the combination of the furnace, the boiler, the hearth or hearths, the air and gas flues connected with the hearth or hearths, a flue between the boiler and furnace by which to conduct the surplus heat to the boiler and valve-controlled connections between said flue and the air and gas flues substantially as shown and described.

2. In a metallurgical furnace substantially as described the combination of the two hearths, the main gas-flue between the same, the side gas and air flues connected with the hearths, connections between said air and gas flues and the main gas-flue, valves controlling such connections and the boiler connected with said main gas-flue all substantially as shown and described.

3. In a metallurgical furnace the combination of the two hearths extending side by side, the intermediate gas-flue arranged longitudinally between said hearths, the outer air and gas flues extending longitudinally along the outer sides of said hearths and connections between said outer flues and the intermediate flue and between the outer flues and the hearths substantially as shown and described.

WILLIAM J. THOMAS.

Witnesses:
JAS. A. JACK,
JAS. E. CAMPBELL.